Nov. 8, 1966 W. T. GOLLWITZER 3,283,870
MATRIX POSITIONING MEANS FOR EMBOSSING MACHINES
Original Filed July 29, 1963 8 Sheets-Sheet 1

Inventor
Walter T. Gollwitzer
By Wallace, Kinzer and Dorn
Attorneys

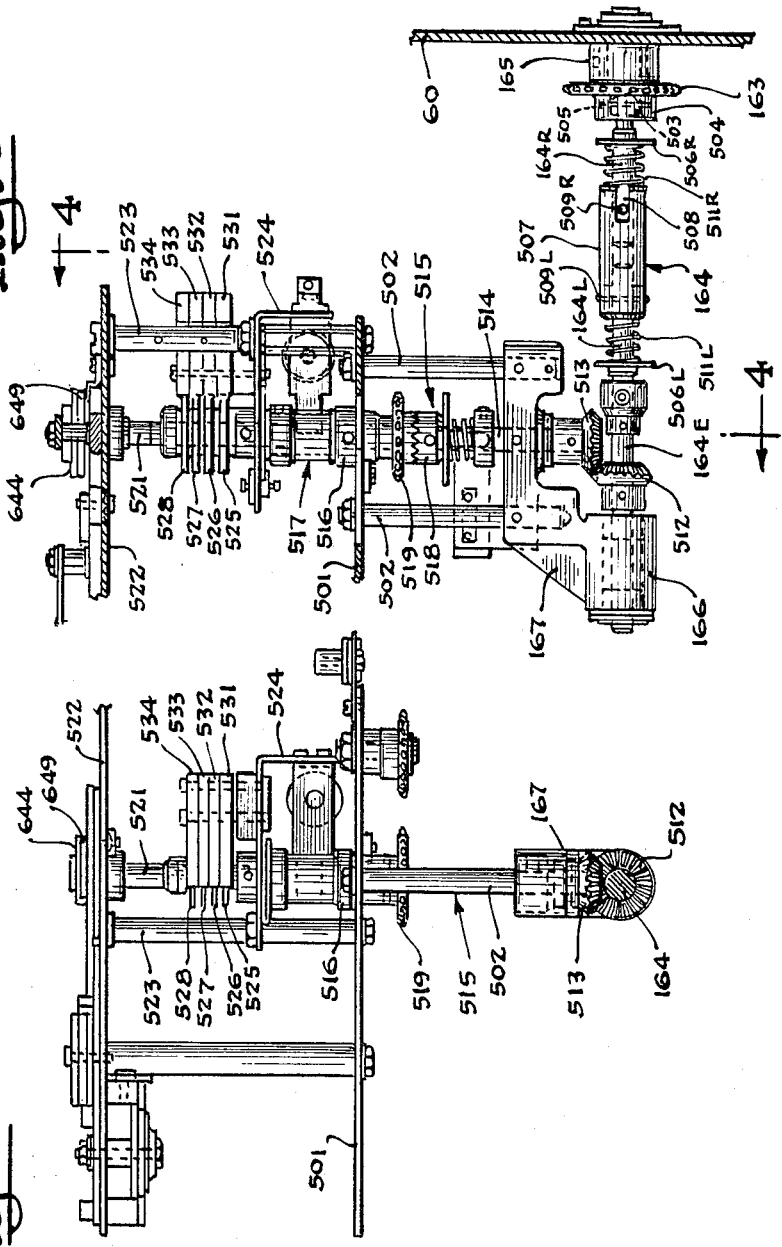

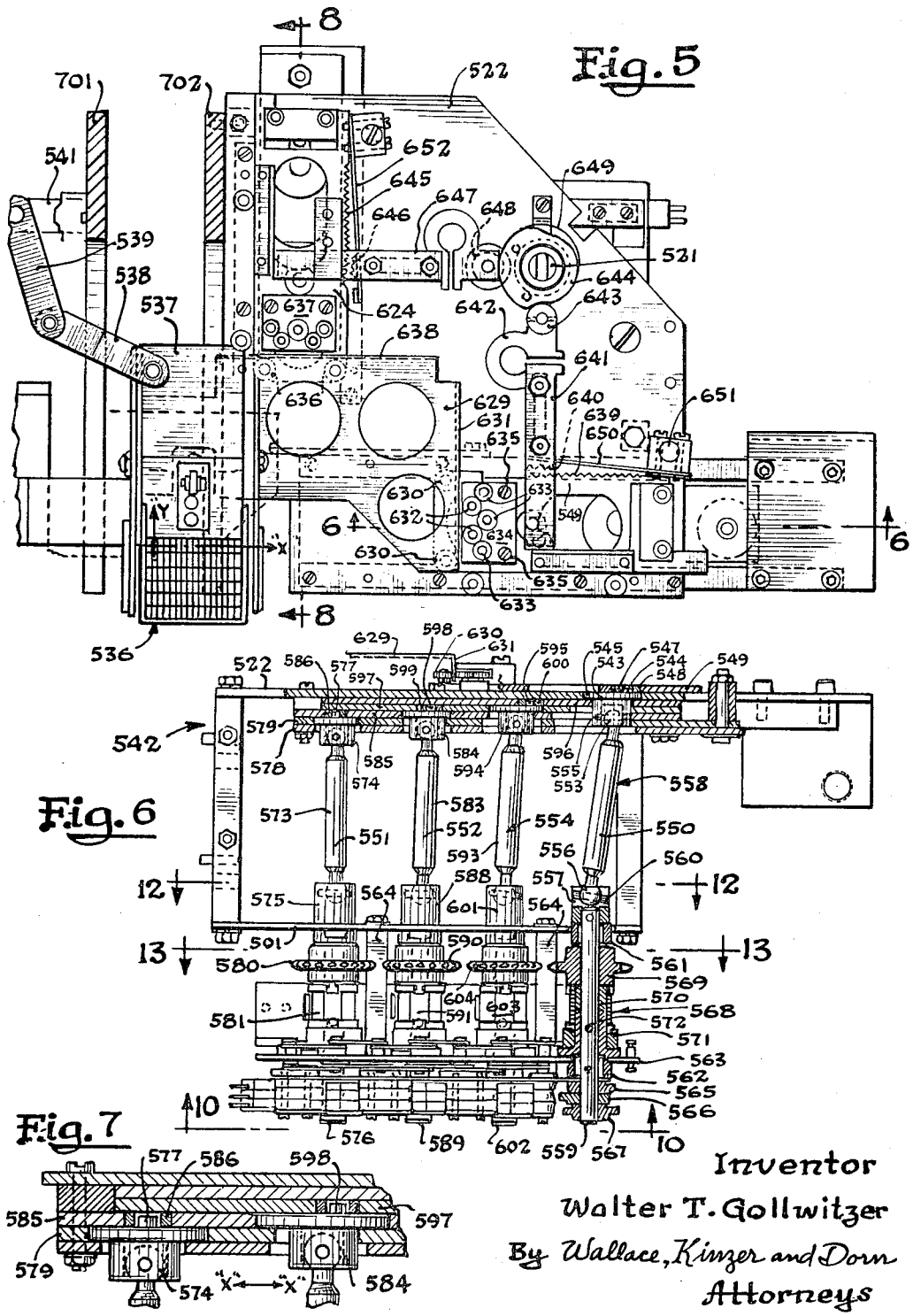

Nov. 8, 1966  W. T. GOLLWITZER  3,283,870
MATRIX POSITIONING MEANS FOR EMBOSSING MACHINES
Original Filed July 29, 1963  8 Sheets-Sheet 4
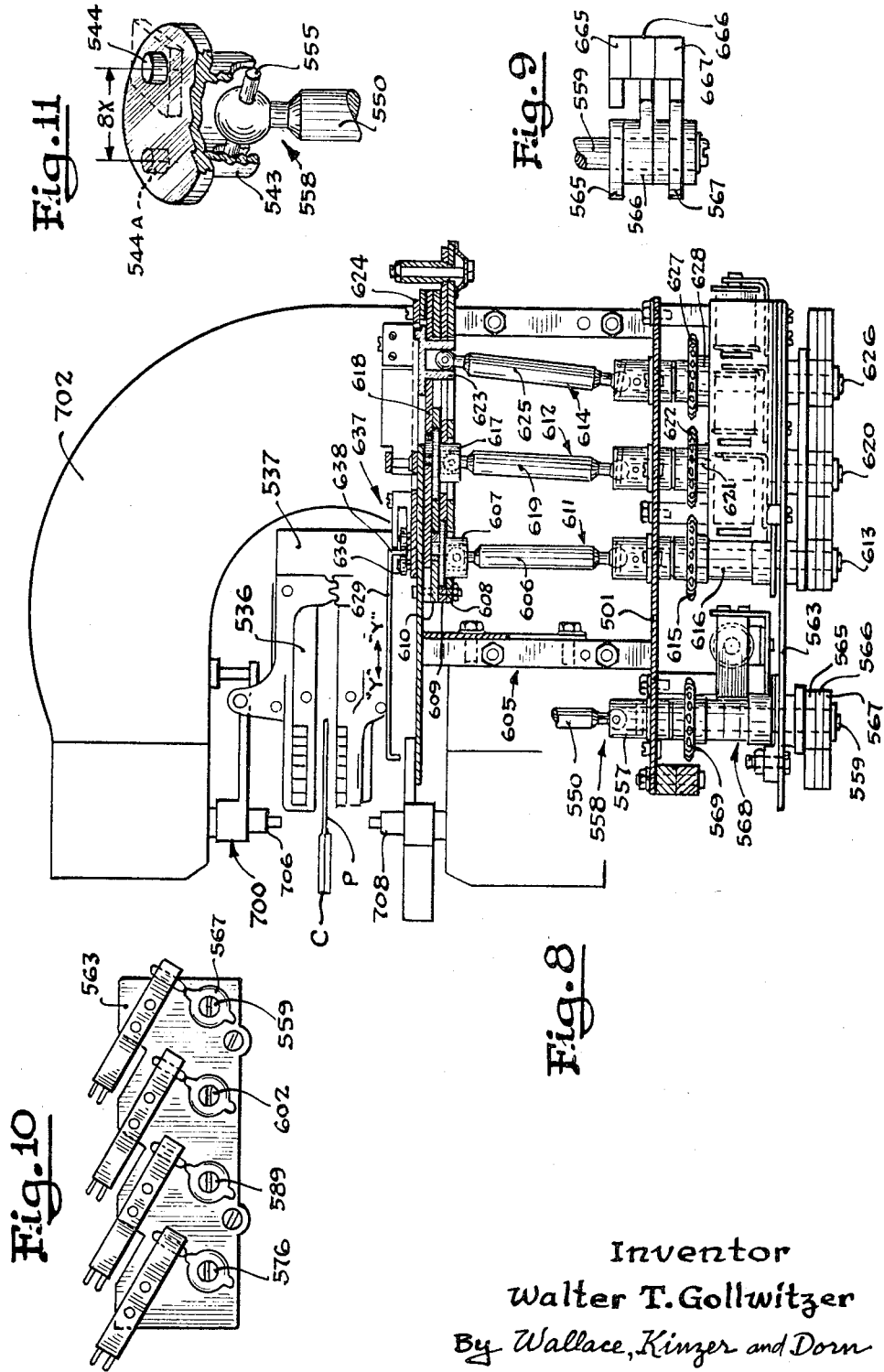
Inventor
Walter T. Gollwitzer
By Wallace, Kinzer and Dorn
Attorneys Nov. 8, 1966 W. T. GOLLWITZER 3,283,870
MATRIX POSITIONING MEANS FOR EMBOSSING MACHINES
Original Filed July 29, 1963 8 Sheets-Sheet 5

Inventor
Walter T. Gollwitzer
By Wallace, Kinzer and Dorn
Attorneys

Inventor
Walter T. Gollwitzer
By Wallace, Kinzer and Dorn
Attorneys

Inventor
Walter T. Gollwitzer
By Wallace, Kinzer and Dorn
Attorneys

United States Patent Office 3,283,870
Patented Nov. 8, 1966

3,283,870
MATRIX POSITIONING MEANS FOR EMBOSSING MACHINES
Walter T. Gollwitzer, Euclid, Ohio, assignor to Addressograph-Multigraph Corporation, a corporation of Delaware
Original application July 29, 1963, Ser. No. 301,693. Divided and this application Sept. 23, 1965, Ser. No. 489,696
18 Claims. (Cl. 197—6.2)

This application is a division of application Serial No. 301,693, filed July 29, 1963, for Embossing Machines.

The present invention relates to embossing machines of the kind effective to emboss type characters and other data representations on printing plates, cards or kindred devices of metal, plastic or fibrous material; such embossed devices are used in printing, sorting, calculating and like operations and are also used for identification, classification and similar purposes.

Embossing machines of the aforesaid kind, which have long been in extensive use, are disclosed in Patent Nos. 1,518,903 and 1,831,103. Embossing machines of this kind have usually used a circular die head that is mounted for rotation about a vertical axis. A continuous channel extends into the die head, from the periphery thereof, and divides the peripheral part of the head into upper and lower portions. A plurality of pairs of cooperating punches and dies are mounted in the circumferential part of the die head with the punch and die of each pair respectively aligned one with the other. The punches and dies are respectively mounted for reciprocal movement in the upper and lower portions of the die head; that is, the punches are usually disposed on one side of the continuous channel and the dies on the other.

In keyboard controlled embossing machines of this general kind, when a key pertaining to a particular type character or the like is depressed, rotary motion of the die head is arrested to dispose a selected punch and die pair in alignment with a predetermined location in the machine known as the embossing position. The device to be embossed, usually in plate form, is disposed in a position such that the device extends into the aforesaid channel in the die head between the particular punch and die pair located at the embossing position. Pressure is applied to the punch and die at the embossing position to move the punch and die toward each other, with the result that a type character or the like is embossed in the interposed device.

When resort is had to a circular rotating die head, as has been customary in the art, the arrangement is relatively massive and cumbersome. This is especially true in those instances where the punches and dies are used to emboss both upper and lower case type characters on the plates, as well as numerals, punctuation marks and the like. To achieve high speed operation in embossing machines of the aforesaid character, it is advantageous to rotate the circular die head rapidly and to stop the same promptly in positioning each selected punch and die pair at the embossing position. This results in some difficulty because of the entailed inertia and momentum. It is apparent, therefore, that it is advantageous to keep the mass of the die head relatively low to reduce entailed inertia and momentum to a minimum, and so to do in a novel manner is an important object of this invention.

It is also advantageous to have the arrangement of the punches and dies in the die head quite compact in order to reduce the distance through which the die head is moved to locate each different punch and die pair in the embossing position. A novel and compact arrangement of the punches and dies constitutes another important object of this invention.

In many instances where type characters or the like are to be embossed on a device in plate-like form, as for example a device to be used for both identification and printing purposes, it is advantageous to provide for embossing of upper and lower case type characters of a particular size on the plate, and also to provide for embossing of other type characters of a different size on the same plate. Thus, in many identification devices which are also employed as printing devices, such as credit cards, it is often advantageous to emboss type characters on the plate from which the identity of the plate card holder may be read or imprinted and also to afford on the same plate a row of type characters, usually in larger sizes than those just referred to, from which an account number or the like may be read or imprinted. When type characters of different sizes are being embossed on a plate or the like, the spacing between embossures in a line across the plate varies in relation to the size of the particular type characters. Hence, where type characters of two different sizes are embossed on a given plate in an embossing machine, it is advantageous to afford a particular character spacing for the type characters of one size and a different character spacing for type characters of another size. To enable this change in line spacing to be effected in a novel and efficient manner without disrupting the character selection operation is yet another object of this invention.

Character selection, in rotary die head embossing machines of the known kind discussed hereinabove, has presented a substantial problem in automatically controlled machines because the actual time required to move the die head to the desired embossing position may vary by a ratio of twenty to one or even more. Thus, the required time for character selection movement is a minimum for movement between adjacent characters in the die head; for characters diametrically opposed to each other in the die head, the required selection time is much greater. Moreover, the selection coding in such a machine may be relatively complex in that the peripheral positions of the punch and die sets are less readily susceptible of convenient identification than with a more compact die head arrangement.

Accordingly, it is a primary object of this invention to afford a compact arrangement and alignment of the punches and dies wherein the individual punch and die sets are quickly and conveniently identifiable in accordance with a simple coordinate code. Another object of primary importance is to reduce the period required for coordinate selection to a consistent minimum time, regardless of the sequence in which characters are selected. Other and related objects are to provide a punch and die matrix in which the punch and die sets are arranged in accordance with a predetermined "x—y" or other dual coordinate system and in which selection may be effected on the basis of a simplified binary code; to afford a selector mechanism controlled directly in accordance with a binary code, as aforesaid, in which the selection operation is effected simultaneously for all code levels on both coordinates to achieve the desired consistent minimum selection period; to instantaneously sum up a series of linear displacements along two coordinate axes, effected by a plurality of individual selectors working along each axis, to provide for character selection of the punch and die matrix as a vector sum of the selector displacements; and to eliminate any necessity for "homing" of the character selection apparatus as an incident to individual character selection operations. A further object of the invention pertaining to character selection is the provision of an inexpensive high speed rotary selector device that is positive and accurate in action and that is capable of coordinated operation with a series of similar devices to effect rapid selection in accordance with a multi-level binary code.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 3 is a front elevation view of the main drive for the character selection mechanism of the present invention;

FIG. 4 is a side elevation view taken approximately along line 4—4 in FIG. 3;

FIG. 5 is a plan view of the character selection mechanism of the present invention;

FIG. 6 is a sectional elevation view taken approximately along line 6—6 in FIG. 5;

FIG. 7 is a detail sectional view of a part of the apparatus shown in FIG. 6 but drawn to a larger scale;

FIG. 8 is a sectional elevation view taken approximately along line 8—8 in FIG. 5;

FIGS. 9, 10 and 11 are detail views of individual parts of the apparatus shown in FIG. 6, FIG. 10 being taken along line 10—10 in FIG. 6;

Figure 2:
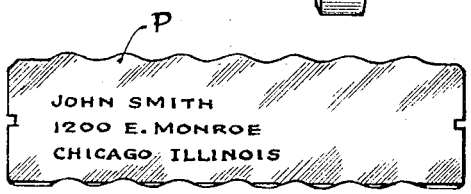
FIG. 2 is a plan view of a metal printing plate that may be embossed in the machine illustrated in FIG. 1.
Figure 2A:
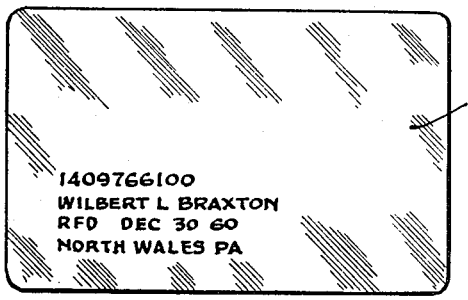
FIG. 2A is a plan view, similar to FIG. 2, of a plastic printing and identification plate that may be embossed in the machine of FIG. 1.

While the embossing machine of the present invention is readily adaptable to effect embossing of metal plates as P, FIG. 2, it is equally applicable to the embossing of plastic printing and identification plates as PP shown in FIG. 2A. Hereinafter the machine will be described as arranged to effect embossing of metal plates as P; no change in the character selection mechanism of the invention is required for embossing of plastic plates.

Figure 1:
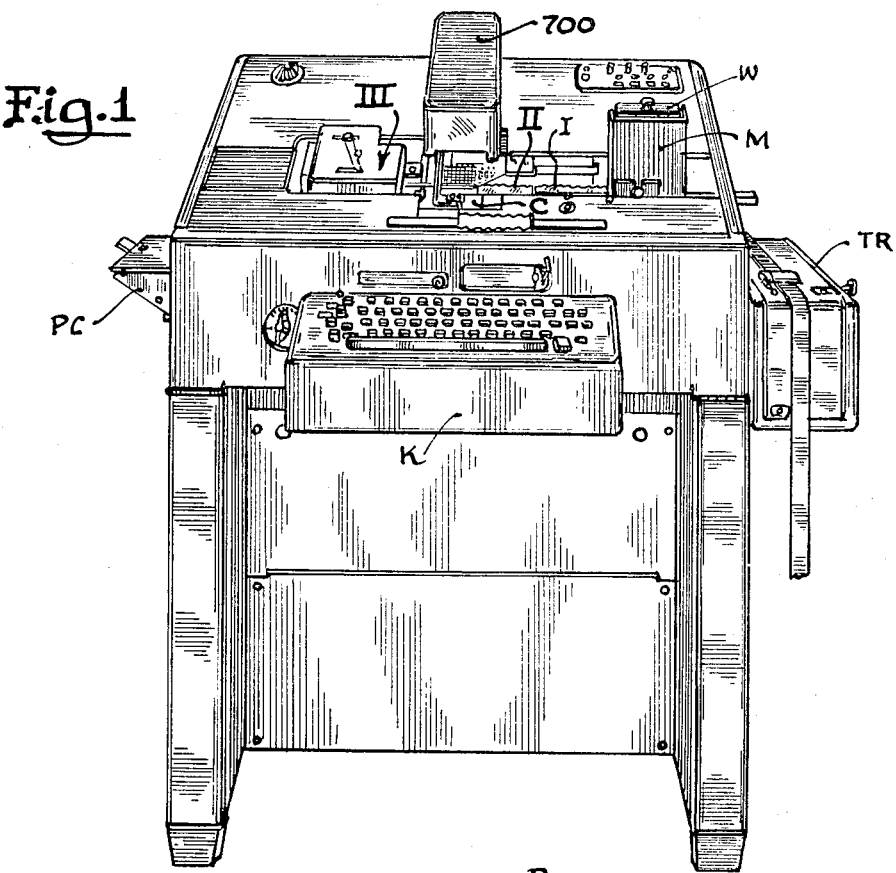
FIG. 1 is a front perspective view of an embossing machine in which the present invention may be incorporated.

Metal plates P that are to be embossed in the machine are inserted into a vertically oriented magazine M, FIG. 1, being stacked one above the other. A weight or follower W may be set on the top of the stack of plates in the magazine M to insure that the plates will be picked up by plate feeding means and advanced from the magazine into the various operating stations of the machine.

The lowermost plate P in the magazine M is advanced from the magazine into station I of the machine, FIG. 1. After a plate has been advanced from the magazine M to station I, the carriage C of the machine is moved into a position immediately adjacent to the left-hand end of station I, as viewed in FIG. 1. Subsequently, the lowermost plate in the magazine M is again advanced into station I, and the plate P which has been disposed in station I is advanced by the oncoming plate into the carriage C. The carriage C then moves into the position II where the first type character is to be embossed on the first plate P. Through the intermediary of an appropriate escapement, not shown, a plate disposed in the carriage C at position II is moved in stepped increments to the left, as viewed in FIG. 1, for embossing of other type characters in the same line as the first type character which appears thereon. The embossing mechanism is incorporated in an embossing head 700 that is movable in a direction normal to character spacing movements of the carriage C to enable predetermined spacing to be achieved among the lines of embossed characters on the plate P.

When embossing of the first line of type characters on a plate P has been completed, the carriage C returns to its aforesaid initial position. A line spacing mechanism is actuated to move the embossing head 700 into position to emboss the second line of characters on the plate P. Sometimes the first type character in the second line of embossed type characters is embossed on the plate in alignment with the first type character in the first line thereon. In other instances, the first type character in the second line may be embossed out of alignment with the first type character in the first line. When this is desired, the plate is located in the proper position through the intermediary of a suitable tabulator mechanism.

The character spacing escapement mechanism advances the plate, as aforesaid, while the second line of type characters is being embossed thereon. When the embossing of this line of characters has been completed, the plate is moved into position to have a third line of type characters embossed thereon and through the intermediary of the aforesaid line spacing mechanism, the embossing head is repositioned a second time. The machine is so arranged that any desired number of lines of type characters may be embossed on a particular plate, depending upon the size of the plate and the use for which it is intended. In any event, when embossing of the plate P has been completed, the plate is then advanced from the carriage C to a subsequent station III in the machine, FIG. 1. When metal plates as P are being embossed, suitable means are provided at station III to roll over the type characters embossed thereon so as to insure that the embossed type characters will be of uniform height on a particular plate.

After a plate has been advanced to station III, a carriage return mechanism in the machine returns the carriage C into position to receive a succeeding plate from station I; this carriage return mechanism also functions to cause the carriage to return to position II to begin embossing the next plate.

When the rolling of a plate has been completed at station III, the plate is then advanced from this station into a discharge chute (not shown) to eventually be collected in a plate collector PC.

The embossing of a plate P may be controlled through the operation of a keyboard K or a tape reader unit TR, FIG. 1. Moreover, there are circumstances under which it may be advantageous to effect the embossing operations through conjoint use of the keyboard K and the tape reader TR. Furthermore, resort may be had to stored data means other than the tape reader TR to control operation of the machine.

The character selection mechanism of the present invention is illustrated in detail in FIGS 3 through 14. A drive shaft 164 for the character selection mechanism, FIG. 3, is supported in two bearings 165 and 166; the bearing 165 is mounted on a side frame member 60 comprising a fixed part of the embossing machine. The bearing 166 is mounted in a support bracket 167. The bracket 167 is supported from a horizontal frame member 501 by suitable means such as a pair of rods 502. The frame member 501 is a part of a movable frame for the embossing head 700 that moves forwardly and rearwardly of the machine for line spacing operations. This movement of frame member 501 is to the left and right, as seen in FIG. 4.

Because the movement of the die head 700 changes the effective length required for the shaft 164, to a limited extent, it is necessary to provide a means for completing a drive connection through the shaft that will compensate for such changes in length. To this end, the shaft 164 is constructed in two sections 164R and 164L these being the right-hand and left-hand sections of the shaft, respectively, as seen in FIG. 3. The right-hand end of the shaft 164R terminates in a ball member 503 located in a suitable socket in the hub 504 of the sprocket 163. A pin 505 extends through the ball element 503 and into suitable apertures in the hub 504 so that the ball 503 is constrained to rotate with rotation of the hub, thereby imparting rotational movement to the shaft segment 164R. A similar mounting arrangement is used to connect the left-hand section 164L of the shaft 164 to an extension portion 164E of the shaft 164.

A pair of washers 506R and 506L are mounted in fixed positions on the shaft segments 164R aund 164L respectively. A sleeve 507 extends between the two shaft sections and is provided with suitable apertures, such as the apertures 508, for engaging a pair of pins 509L and 509R that are affixed to the shaft segments 164L and 164R respectively.

It is thus seen that the sleeve 509L affords a driving connection, for rotational movement, between the two shaft segments 164L and 164R. A pair of springs 511L and 511R are mounted on the shaft segments 164L and 164R in engagement with the sleeve 507 and with the washers 506L and 506R respectively. These springs bias the shaft sections 164L and 164R away from each other, maintaining the two ball elements at the ends of the shaft sections in seated relation in their respective sockets.

A mitre gear 512 is mounted on the extension portion 164E of the shaft assembly 164 (FIGS. 3, 4) and is in meshing engagement with a second mitre gear 513 that is mounted upon the extreme lower end of a shaft section 514 that forms a part of a vertical shaft assembly 515. The shaft assembly 515 extends upwardly and terminates in a connection to the driving member 516 of an electrically actuated character selection index clutch 517. The shaft assembly 515 includes, in the medial portion thereof, a safety device comprising a conventional spring-actuated overload clutch 518. A sprocket 519 is mounted on the driven element of the overload clutch 518 and is utilized to actuate a plurality of individual character selection devices as described in detail hereinafter. The driven element of the clutch 517 is affixed to a further vertical index shaft 521 which extends downwardly from a frame member 522 that forms a part of the movable embossing head assembly 700. The index clutch 517 is suspended from the frame member 522 by suitable means such as a hanger post 523 and a mounting bracket 524.

Four cams 525, 526, 527 and 528, FIG. 3, are mounted on the shaft 521 for rotation therewith and these cams are utilized to control operation of four index switches 531, 532, 533 and 534 respectively. The switch 531 is utilized to actuate the character spacing mechanism of the machine and the switch 532 controls a clutch that, in turn, controls actuation of the operating shaft for the punch and die rams of embossing head 700. The switches 533 and 534 are utilized for auxiliary purposes as, for example, in the control of a data input device such as a tape reader.

The embossing machine includes a punch and die matrix 536, FIG. 5, associated with a punch and die head or holder 537. The die head 537 is supported by means of a linkage which includes a first link 538 that is pivotally mounted at one end on the holder 537, the line 538 in turn being pivotally connected at its other end to a second link 539. The link 539 is pivotally mounted upon an extension member 541 that forms a part of a frame member 701. The frame member 701 and a second frame member 702 comprise a C-frame for embossing head 700, supporting the punch and die actuating rams of the embossing machine. It should be noted that the levers 538, 539 are of rugged construction and afford a linkage capable of supporting the entire punch and die matrix 536. The linkage 538–539 permits omnidirectional movement of the matrix 536 parallel to the movable embossing head assembly 700 and parallel to a plate P mounted on the carriage C. Plate P projects from carriage C into a central opening in the die head; see FIG. 8.

The character selection mechanism of the present invention provides for resolution of the position of the matrix 536 in accordance with rectilinear coordinates but without restricting the matrix to direct movement along the coordinate axes where displacement with reference to both axes is required to position a selected type character for embossure. It is for this reason that the linkage employed is one which allows omnidirectional movement of the matrix in a plane parallel to the plate P. The two coordinate axes of the matrix 536 are identified in FIG. 5 as the X axis and the Y axis, the intersection thereof coinciding with the location of the punch and die rams that are used to produce embossures.

FIG. 6 illustrates a selector mechanism 542 that is utilized to control movements of the matrix 536 along the X axis of FIG. 5. The selector means 542 comprises four individually actuatable selector devices 551, 552, 554 and 558. In FIG. 6 the selector device 558 is shown in complete sectional detail; the remaining selector devices are essentially similar in construction except that each may provide for movement of the type matrix along the X axis through a different displacement distance than the others, as described more fully hereinafter.

The selector device 558 includes a displacement member 543 that is of inverted generally cup-shaped configuration, having an eccentric crank pin 544 projecting upwardly thereof. The displacement member 543 further is provided with an annular flange 545, the flange 545 being approximately as thick as the frame member 522 and being disposed in alignment with this frame member so that the upper surface of the displacement member 543 coincides with the plane of the upper surface of the frame member 522.

The eccentric pin 544 is engaged by a cross head 547. The cross head 547, in turn, is disposed in an aperture 548 in a follower plate or slide 549 that is supported upon the upper surface of the frame member 522. Thus, the member 547 and the pin 544 on the displacement member 543 afford a Scotch yoke. The slide 549 is connected to the punch and die matrix 536 by a mechanism described in detail hereinafter.

The selector device 558 further includes a vertical shaft member 550 terminating, at its upper end, in a ball element 553 that is disposed within the cup-shaped displacement member 543. A pin 555 extends through the ball 553 and is engaged in suitable apertures in the walls of the cup-shaped displacement member 543 so that the displacement member is constrained to rotate in response to rotation of the shaft 550.

The lower end of the shaft 550 terminates in a ball element 556 that is disposed in a socket in a slotted hub 557 mounted upon the upper end of a downwardly extending shaft member 559. A pin 560 extends through the hub 557 and the ball element 556 to afford a rotational driving connection between the hub and ball elements. It is thus seen that both ends of the shaft 550 are provided with modified ball and socket joints which permit angular displacement of the shaft but provide for driving connections through the shaft 550 from the shaft 559 to the displacement member 543.

The lower shaft 559 of the selector device 558 is journalled in a pair of bearings 561 and 562. The bearing 561 is mounted in the frame member 501, and the bearing 562 is mounted in a frame member 563 that is supported from the frame member 501 by suitable means such as a plurality of hangers 564. At the lower end of the shaft 559, three cams 565, 566 and 567 are mounted on the shaft for rotation therewith. These cams are employed to actuate selector switches and safety switches which control actuation of the selector device 558 in accordance with and in conjunction with data input signals as described hereinafter.

Rotation of the shaft 559 is effected through a clutch generally indicated by the reference numeral 568, FIG. 6. The clutch 568 is a simple half-revolution clutch, electrically actuated, and includes a pair of associated driving members 569 and 570 and a driven member 571. The driven member 571 is secured to the shaft 559 by suitable means such as the pin 572. The driving member 569 of the clutch 568 comprises a sprocket that is engaged by a drive chain as described hereinafter.

As noted above, the selector devices 551, 552 and 554 are essentially similar in construction to the device 558. Thus, the selector device 551 includes an upper shaft 573 that is connected at one end by a modified ball and socket joint to a displacement member 574 similar to member 543. The other end of the shaft 573 is connected to a hub 575 on a lower shaft 576. The eccentric crank pin on the displacement member 574 is supported upon a fixed plate 578 that engages the underside of the flange on the related displacement member, the flange being rotated within a relatively large opening in an adjustable fixed plate 579 that is mounted immediately above the plate 578. The drive sprocket for this particular selector device is identified with the reference numeral 580, and this sprocket 580 comprises the driving member of an electrically actuated clutch 581.

The selector device 552 likewise includes an upper shaft 583. The upper end of the shaft 583 is connected by a modified ball and socket joint to a cup-shaped displacement member 584. The flange on the displacement member 584, which is similar in configuration to the member 543 of selector device 558, is disposed in an aperture in a plate or slide member 585 that is supported upon the upper surface of the fixed plate 579. The fit between the flange of the displacement member 584 and the plate 585 is a relatively close one, so that lateral movement of the slide 585 results in corresponding lateral movement of the displacement member 584. The slide 585 is also connected to the displacement member 584 in a Scotch yoke in which the driving element is the crank pin 577, this crank pin being engaged in block 586 corresponding in construction to the block 547. The lower end of the shaft 583 is connected by a modified ball and socket joint to a hub 588 mounted on the upper end of a shaft 589. As in the previously described selector devices, the drive arrangement for the selector device 552 includes a clutch 591 having, as a driving element, a sprocket 590.

The remaining selector device 554 includes an upper shaft 593 connected at its upper end by a modified universal joint to a displacement member 594 including an eccentric crank pin 595. The lower part of the displacement member 594 extends through suitable apertures in the fixed frame members 578 and 579 and in the slide member 585 that are large enough so that these members do not engage the displacement member 594 and hence do not interfere with either lateral or rotational movement thereof. The flange on the displacement member 594, however, is engaged by a slide member 596 that is supported upon the upper surface of a slide member 597 which, in turn, is supported upon the cross slide 585. The cross slide 597 comprises, with the crank pin 598 of the displacement member 584 and the block 599, a Scotch yoke similar to those described hereinabove. The pin 595, on the other hand, is engaged in a block 600 that is located in a suitable transverse aperture in the slide 596 to afford a further Scotch yoke connection. Furthermore, the slide 596 engages the sides of the displacement member 543 of the selector device 558, so that this displacement member is constrained to move in response to sliding movement of the member 596.

The lower end of the shaft 593, FIG. 6, terminates in a modified universal joint that connects this shaft to a hub 601 on the upper end of a vertical shaft 602. The drive arrangement for the selector 554 is essentially similar to that of the previously described selector device and includes an electrically actuated clutch 603. As before, the driving member of the clutch comprises a sprocket 604.

FIG. 7 illustrates in greater detail the upper end of each of the two selector devices 551 and 552 and affords a somewhat better showing of the relationship of the displacement members of these two selector devices to the sliding plates with which they cooperate in the selector means 542. Thus, it is seen in FIG. 7 that the flange on the displacement member 574 provides a close fit with the receiving aperture for the flange in the adjustable fixed plate 579. The plate 579 does not move during operation of the selector means 542. Consequently, the displacement member 574 remains in fixed position except for its rotational movement and the resulting translational movement of the eccentric crank pin 577. The pin 577, on the other hand, is effective to move the cross slide 585 to the left or to the right, as seen in FIG. 7, in a direction parallel to the X axis of the punch and die matrix 536, FIG. 5. That is, rotation of the displacement member 574 moves the pin 577 along an arcuate path, and this arcuate movement of the pin 577 is translated into linear movement of the cross slide 585 through the Scotch yoke connection afforded by the block 586. As described in greater detail hereinafter, only the polar positions constituting the two extreme right and left positions of the eccentric 577 and the cross slide 585 are utilized in character selection.

The aperture in the cross slide 585 which engages the flange on the displacement member 584 affords a close fit with the flange so that the displacement member 584 moves to the right and to the left in response to displacement of the slide 585 and in direct proportion to the displacement of the slide. Furthermore, the Scotch yoke connection between the eccentric pin 598 and the next slide 597 in the series causes the slide 597 to move in a direction parallel to the X axis in response to rotation of the displacement member 584.

It is thus seen that the slide 597 can be moved in response to rotation of the displacement member 584 between two extreme positions; it is also moved in response to rotational movement of the displacement member 574 because the latter rotational movement is translated into linear movement of the slide 585 which in turn shifts the displacement member 584 by corresponding amounts and this movement is reproduced by the slide 597 due to its connection to the displacement member 584. This sequence is repeated through the series of slides in the selector means 542 with the result that the ultimate top slide member 549 of the series is positioned in accordance with the sum of the positional movements of all of the four selector devices, determined by their polar positions. Utilization of this or equivalent mechanisms is an important feature of the present invention, since it makes it possible to reduce the time required for character selection by a substantial amount as compared with selecting devices which must return to a home position in each selection cycle or which operate in sequential manner.

FIG. 8 illustrates a selector mechanism 605 that is essentially similar to the selector mechanism 542 of FIG. 6 but controls movement of the punch and die matrix 536 along the Y axis of FIG. 5. The selector means 605 includes three individual selector devices 611, 612 and 614 that are substantially similar to the selector devices described in connection with FIG. 6. Thus, as illustrated in FIG. 8, the selector device or element 611 includes an upper shaft 606 that is connected at its upper end by a modified ball and socket joint to a displacement member 607 that extends through a fixed frame plate 608 and an adjustable plate 609. The displacement member 607, like those previously described, is provided with an eccentric pin which engages in a Scotch yoke connection in a first cross slide member 610.

The lower portion of the selector device 611 includes a shaft 613 that is connected to the upper shaft 606 by a shaft 613 that is connected to the upper shaft 606 by a modified ball and socket joint, the drive means for the shaft 613 including a sprocket 615 that may be selectively coupled in driving relation to the shaft by means of an electrically actuated clutch 616.

The selector device 612 includes a displacement member 617 having a flange that is engaged by the cross slide 610 and an eccentric pin engaged in a Scotch yoke connection with a further slide member 618 that is disposed on top of the slide 610. The displacement member 617 is connected to an upper shaft 619 which in turn is connected to a lower shaft 620 that may be rotatably driven, through a clutch 621, from a sprocket 622.

The third selector device 614, FIG. 8, includes a displacement member 623, the lower portion of which is disposed in close fitting engagement in an aperture in the slide 618. The flange portion of the displacement member 623 projects into a relatively large aperture in the frame plate 522, and the eccentric pin on this displacement member is incorporated in a Scotch yoke connection with a further cross slide 624. An upper shaft 625 is included in the selector 614, being connected to the displacement member 623 by a suitable ball-pin joint, a similar joint affording a connection from the shaft 625, at its lower end, to a fixed vertical shaft 626. The drive arrangement for the shaft 626 is the same as in the previously described selectors and includes a drive sprocket 627 which may be connected in mechanical driving relation to the shaft 626 to an electrically actuated half-revolution spring clutch 628.

The two top or ultimate slides 549 and 624 of the selector devices 542 and 605 are connected to the matrix holder 537 for the character element matrix 536 by a mechanism which is best illustrated in FIG. 5. As shown therein, the end of the plate 549 nearest the matrix 536 is connected to a juxtaposed plate 629 by means comprising a pair of rollers 630 that are mounted on the left-hand end of the plate 549 as viewed in FIG. 5 and engage a downwardly extending flange 631 on the plate 629. The opposite side of the flange 631 is engaged by a pair of cylindrical rollers 632 which in turn bear upon three solid rollers 633. The rollers 632 and 633 are mounted in a bifurcated mounting block 634 that is secured to the plate 549 by suitable means such as the two screws 635. With this connection, the flange portion 631 of the plate 629 can move between rollers 630 and 632 in a direction parallel to the Y axis of the matrix but is held in fixed position, relative to the plate 549, with respect to movement along the X axis.

A similar mounting arrangement comprising the rollers 636 and a roller assembly 637 affords a connection between a dependent flange 638 on the plate 629 and the upper slide member 624 of the Y-axis selector mechanism 605. Accordingly, it is seen that the plate 629 is free to move parallel to the X axis without interference from the connection to the top slide 624, but that movements of the plate along the Y axis are determined by positioning of the plate 624.

The upper edge of the slide 549, as seen in FIG. 5, is provided with a plurality of serrations or notches 639. A similarly notched or serrated locating element 640 is mounted upon a spring arm 650 affixed to an angularly adjustable mounting block 651 supported on the frame mamber 522. A ram 641 is mounted upon the frame member 522 for axial sliding movement through a limited distance, movement of the ram being guided by engagement with a pair of guide studs 641'. In the preferred construction, illustrated in FIG. 5, the ram 641 is formed with an arcuate section 642 to provide a very limited amount of resilience in the slide member with respect to axial thrust. A cam follower roller 643 is mounted on on end of the slide member 641 and is disposed in engagement with a cam 644 that is mounted on the shaft 521 for rotation therewith.

Similarly, detent or guide notches 645 are formed in one edge of the slide member 624 in position to be engaged by a notched locating member 646 mounted upon a spring arm 652. A ram member 647 is mounted on plate 522 for sliding movement parallel to the X axis, being guided by engagement with two guide studs 647'. The ram 647 carries a cam follower 648 that engages a second cam 649 mounted upon the shaft 521. The two cams 644 and 649 are essentially similar to each other but are displaced 90° with respect to each other to actuate the two ram members 641 and 647 simultaneously.

Figure 12:
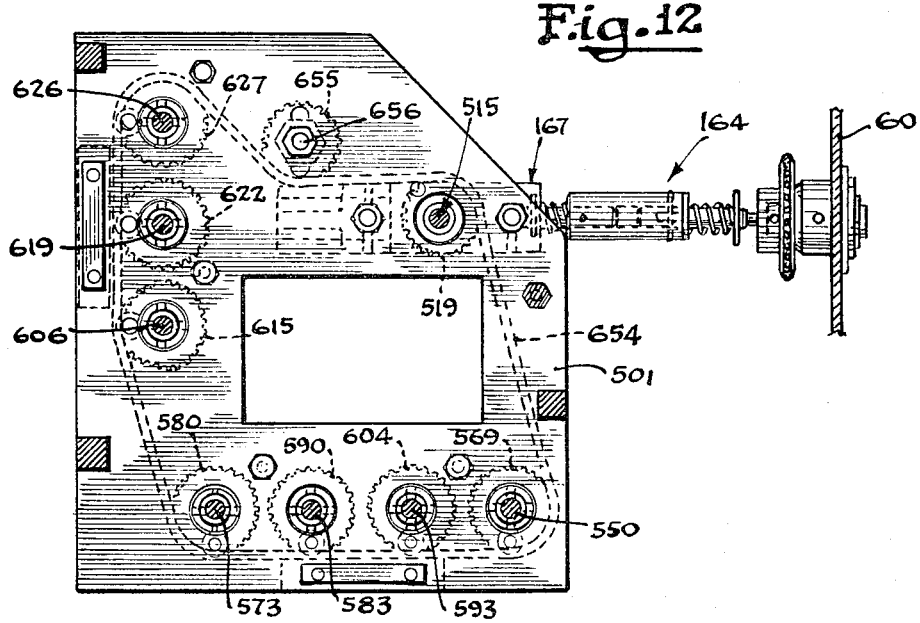
FIG. 12 is a sectional view taken approximately along line 12—12 in FIG. 6.
Figure 13:
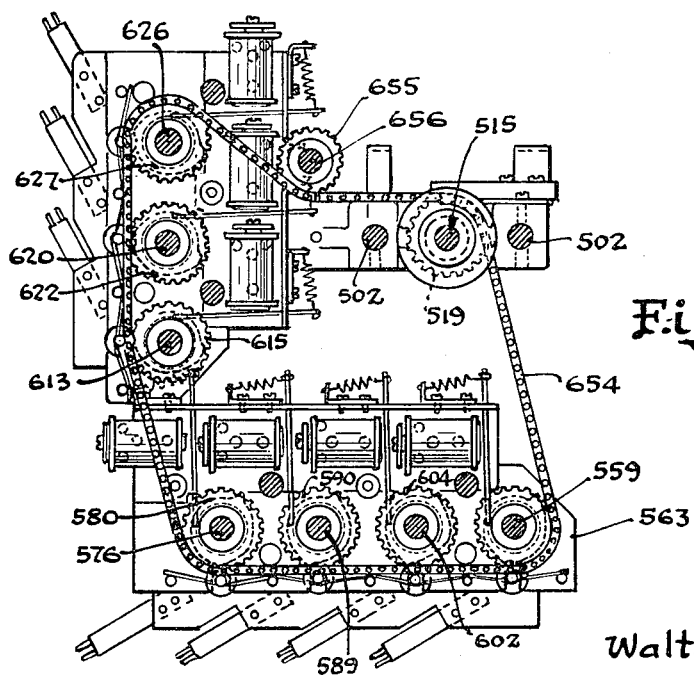
FIG. 13 is a sectional view taken approximately along line 13—13 in FIG. 6.

In order to afford a means for driving each of the individual selector devices described hereinabove, the selector mechanism is provided with a drive chain 654, FIGS. 12 and 13. As shown in FIG. 13, the chain 654 engages the sprocket 519 on the main vertical drive shaft assembly 515 of the character selection mechanism. The chain 654 also engages each of the selector device drive sprockets 559, 576, 589, 602, 615, 622 and 627. In addition, the chain 654 is engaged by an idler sprocket 655 that is mounted on a stud 656 affixed to the frame plate 501, FIG. 12. Thus, since the shaft assembly 515 rotates continuously, due to the driving connection to the sprocket 163 described in detail hereinabove in connection with FIGS. 3 and 4, each of the drive sprockets for the individual selector devices is continuously rotated. On the other hand, this rotation is not imparted to the selector devices themselves, and specifically the displacement members of these selector devices, except when the electrically actuated clutch of a given selector device is energized. This arrangement makes it possible to actuate all of the selector devices simultaneously or to actuate any selected number of selector devices, in any combination, in simultaneous manner. This flexible mode of operation of the selector devices is of substantial importance in achieving the desired mode of operation described hereinafter in connection with the explanatory diagram of FIG. 14.

As noted hereinabove in the description of the selector device 558, FIG. 6, there are three cams 565–567 mounted upon the lower end of the selector shaft 559. The cams 565 and 566 are each single-lobe cams, the lobes of the two cams being diametrically opposed to each other as generally indicated in FIG. 9. The cam 567, on the other hand, is a two-lobe cam, the two lobes on this cam being aligned with the individual lobes on the cams 565 and 566.

The cam 565 is used to actuate a selector switch 665 utilized to identify a logicall (binary notation) "0" or "no" position for the shaft 559. The cam 566 actuates a switch 666 that identifies a logical "1" or "yes" position for the selector shaft 559. Cams 565 and 566 and switcehs 665 and 666 can be replaced by a single cam-actuated single-pole double-throw switch if desired; see FIG. 19. The cam 567, on the other hand, actuates a safety switch 667 that affords a positive indication that the shaft 559 is in one or the other of its "0" or "1" positions without identifying the particular position in which the shaft is oriented.

Correlation of the cams with the displacement member 543 is achieved by aligning the cams so that when the displacement member 543 is in the position illustrated in FIGS. 6 and 11, the lobe of the cam 565 engages and actuates the "0" position switch 665. That is, the "0" position of the eccentric 544 corresponds to the extreme righthand position of the eccentric as shown in FIGS. 6 and 11. The cam 566 is positioned to close the switch 666 when the eccentric 544 is in the diametrically opposed position to that illustrated in FIGS. 6 and 11. That is, the switch 666 is actuated whenever the displacement member 543 is rotated 180° to move the pin 544 to its extreme lefthand polar position, this being the "1" position of the displacement member 543 and of the selector device in which it is incorporated.

Switch 667 is operated to open and close each time the selector shaft 559 rotates 180°, affording a check on the shaft's rotation. This relationship is illustrated in FIG. 10, which shows all of the safety switch cams in engagement with the actuating elements of their associated safety switches; and this condition obtains regardless of whether the selector devices are in the "0" or "1" positions.

As shown in FIG. 11, the crank pin 544 of the selector device 558 is actuatable between the "0" operating position and the "1" operating position, indicated by the phantom outline 544A. These two operating positions for the crank pin are separated by a predetermined displacement 8X which may be assumed to represent eight incremental character element spaces along the X axis as described more fully hereinafter in connection with FIG. 14. The total displacement for the selector device 554 may be made equal to four incremental character element spaces in the X direction. The selectors 552 and 551, on the other hand, may be constructed to provide total displacements along the X axis of two and one character element spaces, respectively. By the same token, the selector devices 611, 612 and 614 afford total displacements, along the Y axis of one, two and four units respectively. The increments of displacement in the X and Y directions need not be equal to each other, but are related to the dimensions of the character elements of the machine, the punches and dies in the matrix 536. Furthermore, substantial variations in the displacement distances and their relation to the dimensions of the punches and dies may be made, as described in detail hereinafter.

Figure 14:
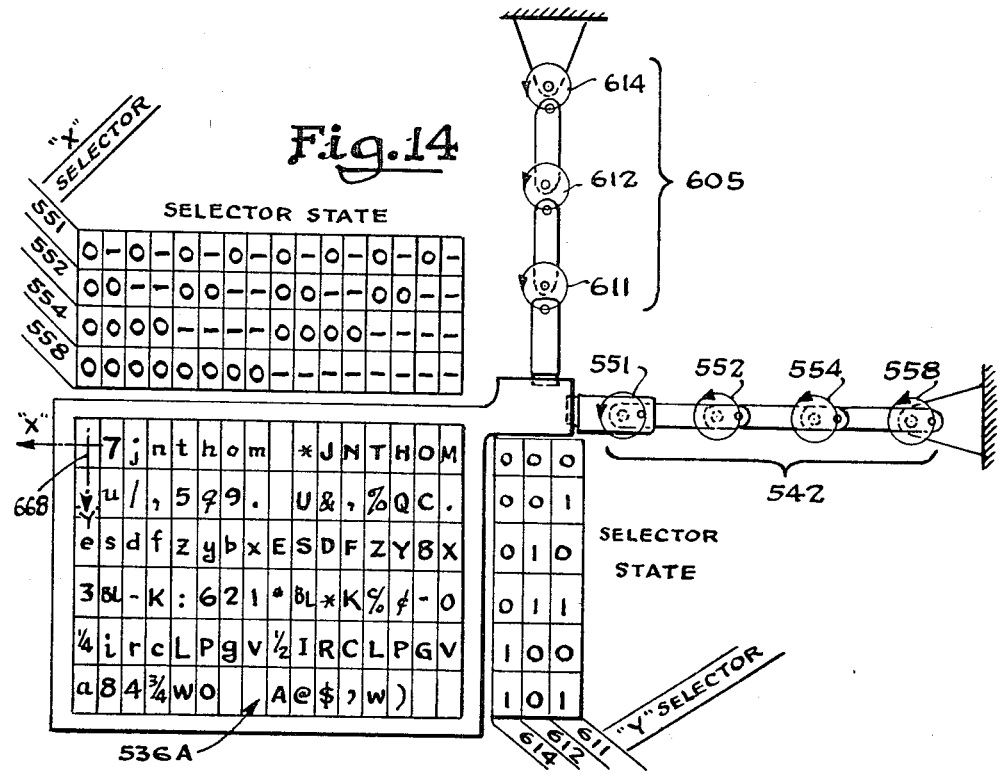
FIG. 14 is a diagrammatic view illustrating the manner in which character selection is effected by the present invention.
Figure 15:
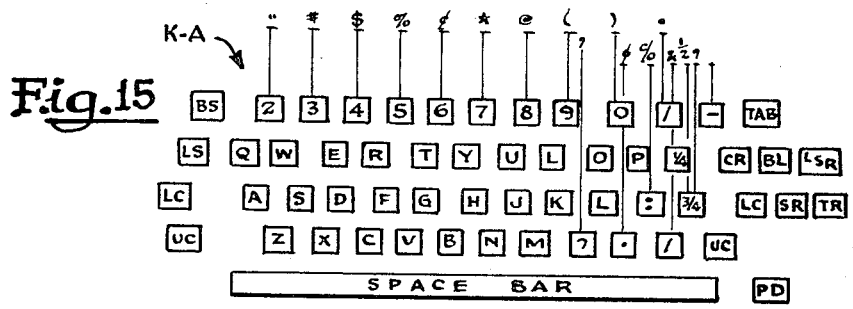
FIG. 15 illustrates a keyboard arrangement which may be utilized with the character selection arrangement of FIG. 14.

FIG. 14 illustrates a typical punch and die matrix arrangement, in schematic form, and shows the location of individual type characters in the matrix. The matrix 536A of FIG. 14 is correlated with the keyboard arrangement K-A shown in FIG. 15. In FIG. 14, the type matrix 536A is positioned with the punch and die combination 668 located at the intersection of the X and Y axes and, accordingly, disposed in position for an embossing operation. It happens that the matrix arrangement 536A does not include a type character at this position, the punch and die combination 668 being blank.

In embossing a printing plate or other member, it may be desirable to emboss the character "7" as the first data item. To this end, a machine operator may depress the "7" key (FIG. 15) to select this character. When this is done, the keyboard mechanism sets up an operating circuit which is effective to condition the selection mechanism in accordance with a binary code of:

$$X = 0001$$
$$Y = 000$$

this being the code identification for the character "7" as shown in FIG. 14. The encoding circuits of the machine are then effective to energize the selector devices above described in accordance with this code, and the locking rams 647 and 641, FIG. 5, driven by cams 644 and 649 on shaft 521 approach their locking position, due to rotation of shaft 521. Because each of the three Y axis selectors 611, 612 and 641 is already in the "0" position, and because these selectors are identified as being in their "0" positions by their associated sensing switches, as described hereinabove, the clutches 616, 621 and 628 remain disengaged. Furthermore, the operating clutches for the selector devices 552, 554 and 558 are maintained unenergized because these selector devices are already in their "0" positions and no change is required.

The clutch 581 for the selector device 551, FIG. 6, however, is energized through a circuit established by the sensing switches of the selector 551, since this selector must be driven to its "1" positions. The switch whose closed state effects this energizing circuit occupies the position analogous to switch 666 in selector 550, FIG. 9. With clutch 581 engaged, the selector is rotated through the driving means comprising the chain 654 and the clutch 581 until the selector switch for the "1" position of the selector is actuated. With the clutch 517, FIG. 3, engaged, the shaft 521 rotates, rotating the cams 644 and 649 and driving the rams 641 and 647 toward the selector plates 549 and 624, respectively, as shown in FIG. 5. The movement of the two rams 641 and 647 brings the serrated locating members 640 and 64 into engagement with the notched portions 639 and 635, respectively, of the two slides 549 and 624. Engagement of the locating members in the notched portions of the two slides effects a final positioning movement of the slides and locks the slides in place. The sequence of commencing rotation of shafts 551 and 521 must be such that shaft 551 comes to rest before notched portions of locking rams 647 and 641 enter the locus of motion of slides 645 and 639, respectively. Accordingly, the connector plate 629 is locked in position, the only displacement thereof having been a movement of one increment to the left, as seen in FIG. 5, caused by actuation of the selector 551. Thus, the selector apparatus is located in the desired operating position with the punch and die combination for the character "7" located at the junction of X and Y axes in position for an embossing operation.

The next character to be embossed may be the character "g." The coordinates for this character, as shown in FIG. 64, are:

$$X = 0110$$
$$Y = 100$$

as expressed in binary notation. To select this character, the selector devices 552 and 554 are each actuated to their "1" condition by energizing their associated clutches 591 and 603 (FIG. 6) to afford a drive connection to the selectors until the safety switches associated therewith afford a positive indication that the selectors are in the desired "1" orientation. The selector 551 had previously been established in its "1" position in embossing the character "7." Consequently, it is again energized through a closed selector switch and driven to the "0" position, and in this sense a subtracting operation is entailed. However, as explained below, vector addition is involved in each and every instance when moving the punch and die matrix from any given position to the next embossing position. The 558 selector, on the other hand, is not energized because it is already in the desired "0" operating position.

In the instance of selecting the character "g" selection must also be made along the Y axis. Thus, the operating clutch 628, FIG. 8, is energized and the selector 614 is rotated until the switches associated therewith are actuated. There is no need to actuate the selectors 611 and 612, and because the selector switches associated with these selectors indicate that they are already in the desired operating positions, they remain unactuated.

When all of the selector switches for the selectors are actuated to indicate that selection is complete, the clutch 517 on the shaft 521 is again energized to rotate the two cams 644 and 649, driving the two rams 647 and 641 as described hereinabove to accomplish final positioning and latching of the two selector means 542 and 605. Embossing is accomplished while these rams hold the selector devices in latched position, and the continued rotation of the shaft 521 ultimately releases the two rams.

It should be noted that those selector devices requiring actuation to achieve movement of the matrix 536A and bring the character "g" into position at the junction of the X and Y axes (selectors 551, 552, 554 and 614) are all actuated substantially simultaneously. That is, the selectors are not operated in sequence; furthermore, the selection apparatus is not returned to a home position but starts its movement from its previous embossing position in which the character "7" was aligned at the junction of the X and Y axes. Because all of the selectors operate substantially simultaneously, and because the two selector mechanisms 542 and 605 afford a summing action with respect to the individual selector devices, the matrix 536A moves directly along a path corresponding substantially to the vector sum of the displacements of the individual selector devices. This action is graphically illustrated in FIG. 16.

Thus, in the first movement described hereinabove, the movement of the matrix relative to the intersection of the X and Y axes proceeds in accordance with the vector 669, along the X axis, to the location corresponding to the type character "7." In the next movement, the selector means 542 is actuated to move the matrix to the coordinate location 0110, parallel to the X axis. At the same time, the selector means 605 is actuated to move the character element matrix to the location 100 relative to the Y axis, the two coordinate movements being indicated by the vectors 670 and 671. Because selection relative to the X and Y axes is accomplished simultaneously, the actual path of movement of the matrix corresponds generally to the vector 672. That is, the matrix proceeds directly and along a substantially linear path 672 from the location for the character "7" to the location for the character "g."

If the next character is to be embossed in the letter "Y," it is necessary to shift the matrix from the coordinate position for the letter "g" to the location having the following coordinates:

$$X=1101$$
$$Y=010$$

This entails actuation of the selector device 558 from the "0" condition to its "1" condition. The selector device 554 remains unchanged in its operating condition. The selector 552 changes from its "1" condition to its "0" condition and the selector 551 is actuated from its "0" condition to its "1" condition. It is also necessary to actuate the selector 614 from its "1" condition to its "0" condition and to actuate the selector 612 from its "0" condition to its "1" condition. The selector 611 remains unchanged in its operating condition. In this instance, the path of movement of the matrix is illustrated by the vectors 673 and 674 in FIG. 16; the matrix moves along this path rather than along individual axial paths which it would follow if it were not for the simultaneous action of the two selection means. In connection with this movement of the matrix, it should be noted that actuation of the fourth order selector 558 for X axis movement is controlled by actuation of the upper case shift key of the keyboard K-A. Thus, the letter "Y" is in the upper case portion of the keyboard, and control of the selector 558 from the upper and lower case keys of the keyboard is effective to perform this part of the selection operation.

Figure 16:
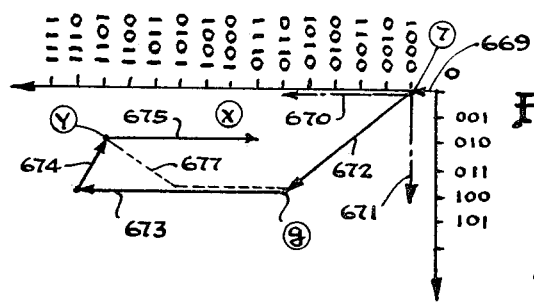
FIG. 16 is a chart used to explain movements of the punch and die matrix during character selection operations.

On the next embossing operation, it may be desirable to shift back to the lower case in order to emboss the character "x." To accomplish this end, the individual selector devices in the X axis selector mechanism 542 are actuated to move the punch and die matrix 536A parallel to the X axis along the vector 675 as shown in FIG. 16.

In the foregoing description of operation of the selection system of the invention, the incremental displacement of the matrix 536A effected by the selector 551 is equal to the width of one of the punch and die elements of the matrix. That is, this displacement is equal to the center-to-center spacings of the character elements, which in this arrangement are all equal. Accordingly, with the binary coding arrangement described, the displacements for the selectors 552, 554 and 558 are equal to two, four and eight times the basic center-to-center spacing in the X direction. By the same token, the displacement effected parallel to the Y axis, by the selector 611, is equal to the center-to-center spacing between character elements in the direction of the Y axis. The displacements for the selectors 612 and 614 are twice and four times that of the selector 611, thereby following a consistent binary coding system. However, it is not essential that a direct and consistent binary displacement arrangement be employed; rather, this may be modified to accommodate variations in the size of the character elements for the punch and die combinations in the matrix 536A. The total displacement for each selector device, as it moves between its "0" and its "1" positions, is of course determined by the positioning or displacement elements of the devices, the eccentric pins such as the pin 544 for the selector 558, as described hereinabove.

The intersection of the X and Y axis, FIG. 14, represents, in the machine, the index position relative to which the character matrix 536 as a whole is movable in positioning a selected character for reproduction at the index position. The index position, moreover, is intersected by the axis of the character reproducing means, represented in the present instance by the common axis of the punch and die rams 706 and 708 (FIG. 8). Thus, when selecting a character to be reproduced on the plate P or like article, FIG. 8, arranged in its carriage C for character spacing movement, the matrix as a whole is moved bodily to present to the reproducing means at index position the character selected for reproduction. The die head or matrix 536 is secured for line spacing movement to the support which carries the punch and die rams, and from this it will be recognized that the index position does not change relative to the matrix, although the index position and the matrix will be relocated together through a line spacing increment of movement each time a new line of characters is to be embossed.

Figure 17:
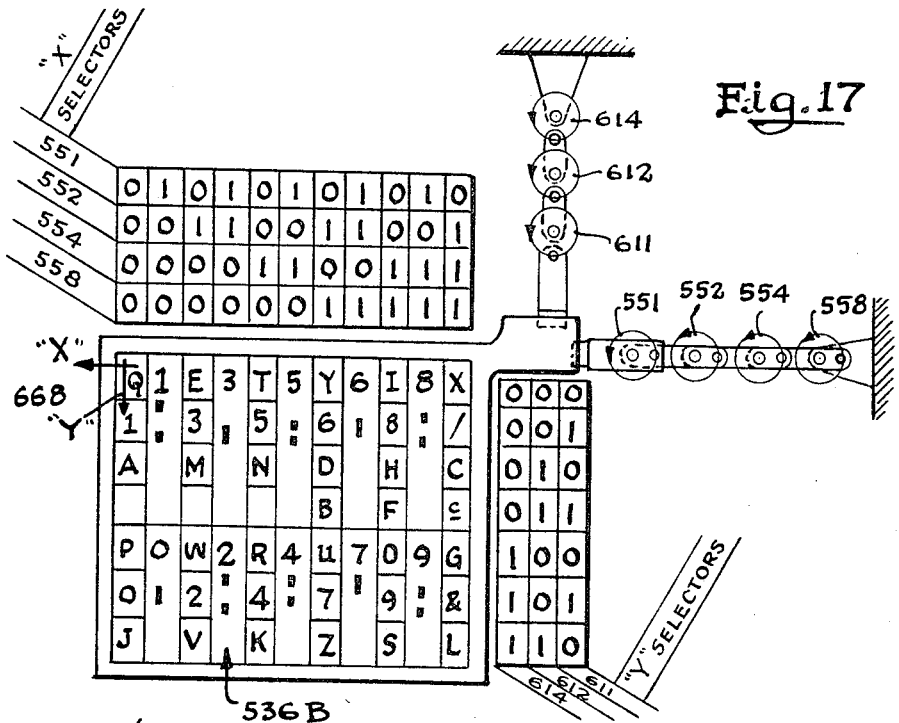
FIG. 17 is a diagrammatic view, similar to FIG. 14, illustrating another form of punch and die matrix that may be used in the embossing machine in conjunction with the present invention.

FIG. 17 illustrates a type matrix arrangement that may be used in the embossing machine and that employs numeric shift conditioning for positioning control of the die head. FIG. 17 is essentially similar to the schematic illustration of the punch and die matrix arrangement in FIG. 14, and shows the horizontal selector devices 551, 552, 554 and 558 and the vertical selector devices 611, 612 and 614 connected in operative relationship to punch and die head or matrix 536B.

Unlike the matrix 536A of FIG. 14, the matrix 536B is not uniform in the alignment of the character elements. Alternate vertical columns of the character elements (punches and dies) in die head 536B each include seven individual elements, as in the originally described matrix arrangement. But the intervening columns each include only two character elements, these being relatively large numbers each provided with a large numerical figure and a code marking. For this matrix, the operating distances or increments afforded by the selector devices 611, 612 and 614 remain the same, but the incremental operating distances for the horizontal group of selector devices are changed. Thus, instead of employing the distance ratio of 1:2:4:8, as in the initially described arrangement, the incremental operating distances for the devices 551, 552, 554 and 558 are made to conform to the ratio 0.75:1.5:3:3.

The die head 536B is included primarily to illustrate the flexibility of the embossing machine character selection mechanisms of the present invention. This form of matrix may be used, for example, in the preparation of embossed plastic credit cards bearing coded serial number data and also carrying ordinary uncoded alpha-numeric identification identifying a credit patron. As may be seen from the selector setting charts comprising a part of FIG.

17, the selector device 551 is used, in this arrangement, only for selection of the large coded numerical figures.

Figure 18:
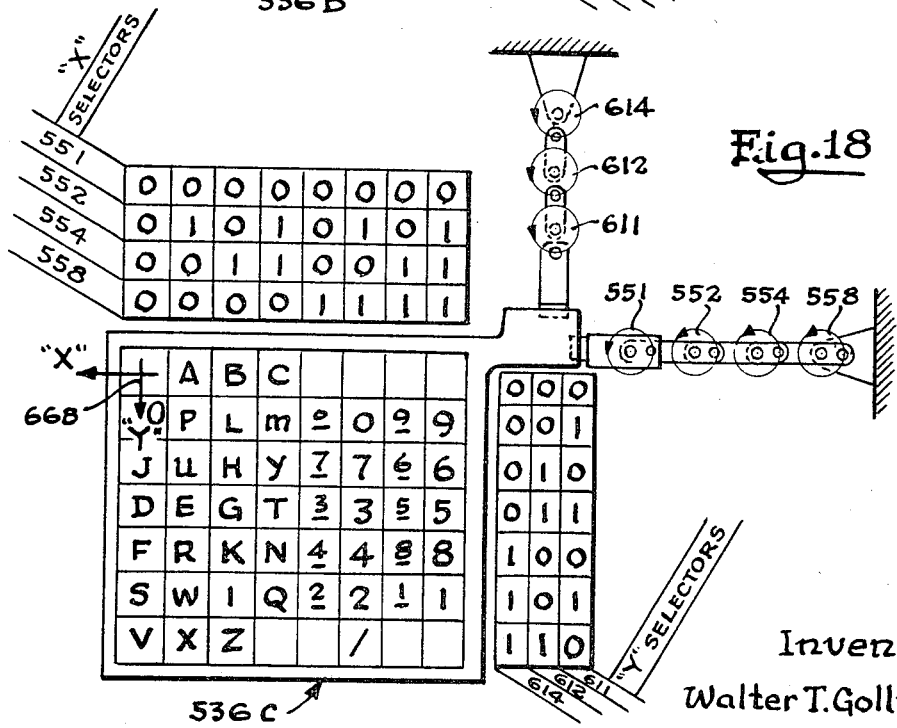
FIG. 18 is a diagrammatic view illustrating yet another punch and die matrix for the embossing machine.

FIG. 18 illustrates yet another punch and die matrix 536C that may be used in the embossing machine. This matrix provides a complete set of capital alphabetic figures plus two sets of numerical figures of different size, the smaller set of numerical figures being underlined. Again, it is necessary to modify the operating distances for the selector devices 551, 552, 554 and 558. In this instance the ratio of operating distances for these devices is 0:1:2:4, the selector 551 not being used for this particular matrix.

In connection with both of the matrix arrangements shown in FIGS. 17 and 18, it is of course necessary to afford a keyboard including a commensurate group of character keys if keyboard operation is required. Moreover, in connection with the arrangement of FIG. 18, any input tape used to control the machine must include code differentiation between the two sets of numerical characters incorporated in the matrix, and this is equally true with respect to FIG. 17.

Figure 19:
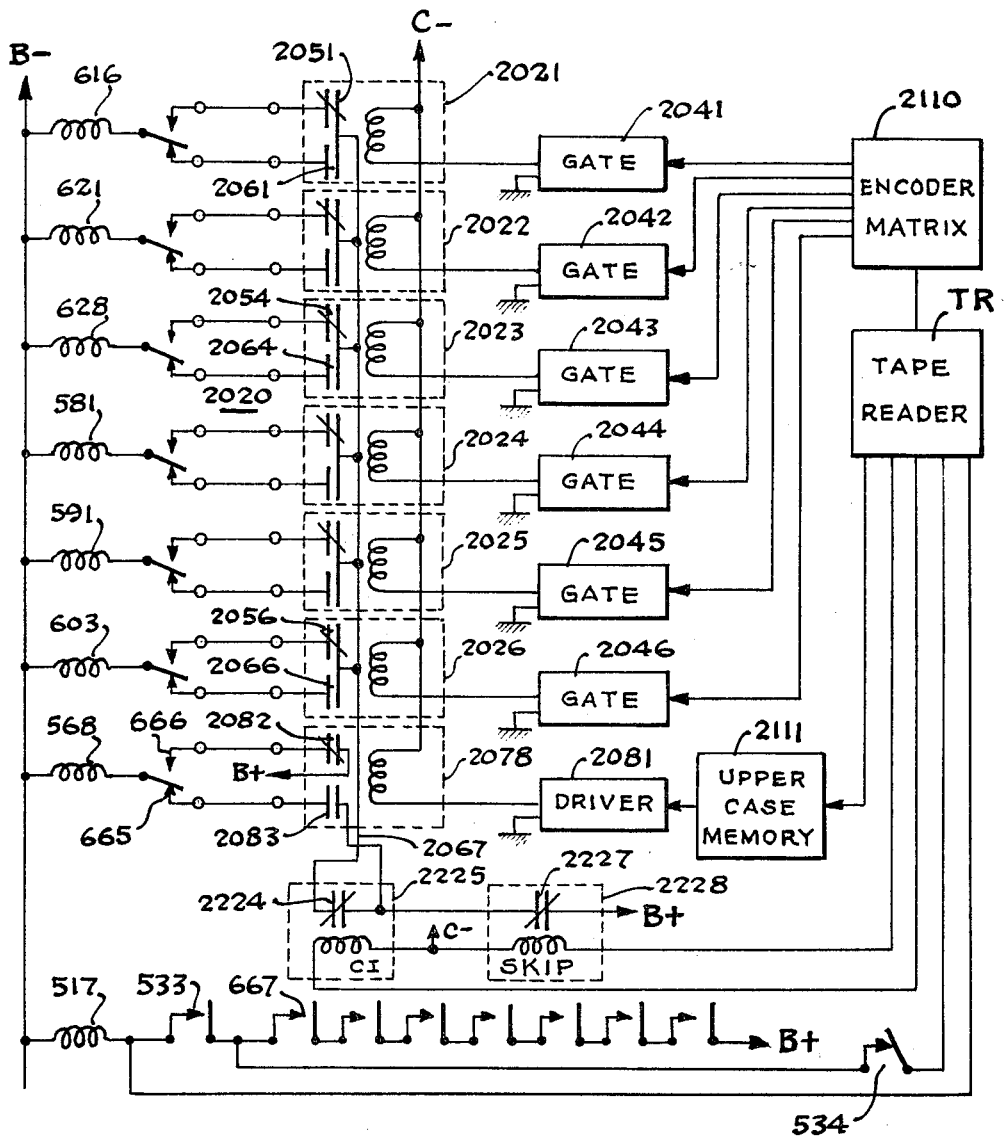
FIG. 19 is a combined schematic and block diagram, greatly simplified, of the electrical controls for the character selection mechanism.

FIG. 19 is a greatly simplified combined schematic and block diagram of the control circuits for the selector mechanism of the present invention. For the complete schematic circuit of the entire embossing machine, in a typical installation, reference may be made to application Serial No. 301,693, filed July 29, 1963, of which the present application is a division.

As shown in FIG. 19, the operating coils for the character selection clutches 568, 581, 591, 603, 616, 621 and 628 are all connected at one terminal to a D.C. supply designated as B—. The other terminal of each coil for the character selection clutches is connected to the two control switches on the associated character selector shaft. Thus, wth reference to the operating clutch 568 for the selector shaft 559 of selector 558, it is seen that one terminal of the clutch coil is connected to the B— supply and the other terminal of the coil is connected to a movable contact engageable with either of two fixed contacts 665 and 666. In the actual construction, as described above, independent switches may be employed instead of the single-pole double-throw construction illustrated in FIG. 19, the latter having been adopted to simplify the drawing and to save space.

In each instance, closure of the illustrated single-pole double-throw switch upon its lower contact, such as the contact 665, indicates that the selector shaft is in its "0" or "NO" position. On the other hand, if the associated selector shaft is in the "1" or "YES" position then the switch is engaged with the upper fixed contact such as contact 666.

The position indicating switches for the selector shafts are individually connected to the terminals of a plugboard 2020. The plugboard connections may be varied to suit the requirements of different punch and die matrix arrangements. The connections illustrated in FIG. 19 are those pertaining to the matrix arrangement illustrated in FIG. 14. The plugboard affords a means for connecting the character selection position switches (665, 666, et seq.), and hence the character selector clutches, to a series of six character selection relays 2021–2026. Each of the relays 2021 through 2026 includes an operating coil, a set of normally closed contacts and a set of normally open contacts. One terminal of each of the coils is connected to a suitable power supply designed as C—. The remaining terminal of each coil is connected to the output of one of six gate circuits 2041–2046.

Within the relays 2021–2026, one contact of the normally closed pair is connected to one contact of the normally open pair. In these contact pairs, the normally closed contacts are identified as contacts 2051–2056 and the normally closed contacts as 2061–2066. With the plugboard connected as shown, each of the normally closed contact pairs, such as contact pair 2051, is connected across to the "1" or "YES" switch of the corresponding character selection clutch. The normally open contacts are connected through the plugboard, individually, to the "0" or "NO" position-identifying switches of the character selection mechanism. The common contacts of the normally open and normally closed pairs are connected to B+ through a conductor 2067 and an enabling circuit controlled by the tape reader and including the normally closed contacts 2227 of a skip relay 2228.

As shown in FIG. 19, there are only six character selection relays 2021–2026 whereas there are seven character selection clutches. The seventh character selection clutch 568, in the plugboard arrangement shown in FIG. 19, is actuated by a case shift control relay 2078. The operating coil of the case shift control relay has one terminal connected to a drive circuit 2081 with the other terminal of the coil being returned to the C— supply. Driver 2081 is actuated from an upper case memory flip-flop 2111 connected to the tape reader TR. Relay 2078 has a pair of normally closed contacts 2082 connected from the "YES" or "1" position switch terminal 666 to the B+ supply. The relay 2078 also includes a set of normally open contacts 2083 connected from the "NO" or "0" switch 665 through the skip relay contacts 2227 to the B+ supply. The skip and character inhibit relays are actuated from the tape reader.

With the taper reader TR energized, the tape reader is driven and senses the first code unit in the tape in conventional manner. On the assumption that the initial character code unit read from the tape is representative of a character to be embossed, the tape reader TR produces a unique readout signal, in its initial cycle of operation, that is supplied to the encoder matrix 2110 and actuates one or more of the character selection gates 2041–2046. The selected and actuated gates, in turn, operate to complete energizing circuits for the corresponding character selection relays 2021–2026.

For example, the operating coil 2034 of relay 2024 may at this point be energized by completion of an operating circuit through gate 2044. Actuation of the relay opens the contacts 2054 and closes the contacts 2064. Closing of the contacts 2064 provides an energizing circuit for the character selection clutch 581, this circuit beginning at the B— bus in FIG. 19 and extending through coil 581 and the selector position-sensing switch to contacts 2064. From contacts 2064, the circuit continues through conductor 2067 to the normally closed contacts 2224 of the character inhibit relay 2225. The circuit is completed through normally closed contacts 2227 of skip relay 2228 and through a tape reader timing switch (not shown) to the B+ supply.

Energization of the character selection clutch solenoid 581, as described above, is effective to rotate its associated selector shaft, opening the normally closed selector switch, and closing the normally open selector switch, associated therewith. But the normally closed selector switch is in series with contacts 2064 and solenoid 581; when the switch opens the clutch solenoid is de-energized, so that the shaft comes to rest in its alternate or "1" position.

The same operation is carried out with respect to any other selected character selection clutch solenoids, where their associated shafts are not already in the position determined by the character code signal from matrix 2110.

As described above, the individual movements of the selector shafts controlled by the character selection clutches are added vectorially to produce the required motion of the type matrix and to position the selected character at the embossing location.

While character selection is being completed, the tape reader closes a switch (not shown) with the result that the index bolt clutch represented by a solenoid 517 in FIG. 19 is energized (see also FIG. 3). Timing of this operation is adjusted to effect the locking of the punch and die matrix in its selected position very quickly after that position has been reached. The indexing mechanism actuated by clutch 517 locks up the punch and die matrix by means of the serrated index members that engage corresponding members on the character slides.

The shaft 521 actuated by index clutch 517 also operates several switches. Initially, switch 531 (FIG. 3) closes, energizing a character spacing clutch, through a circuit not illustrated, to effect a character spacing movement of one increment in the embossing machine.

Continued rotation of the index bolt shaft 521 closes switch 533, FIGS. 3 and 19. This completes an alternate operating circuit for the index clutch 517, permitting the shaft 521 to continue its rotational movement, providing all of the character selector shafts have come to rest in their polar positions so that all of the safety switches 667 et seq. incorporated in series in this operating circuit are closed.

Next, switch 532 (FIG. 3) is closed, energizing solenoids to drive the rams of the embossing machine. Energization of the ram solenoids is effective to actuate the linkage that drives the punch and die rams of the embossing machnie through an embossing operation.

Finally, switch 534, FIGS. 3 and 19, which is opened in the initial portion of the operating cycle of the index shaft 521, is re-closed. This completes an operating circuit for the tape reader that enables the tape reader to proceed with the sensing and readout of the next code unit.

Hence, while preferred embodiments of the invention have been described and illustrated, it is to be understood that they are capable of variation and modification.

I claim:

1. In an embossing machine, a punch and die operating and selection mechanism comprising:
   a series of punches and a series of complemental dies arranged in alignment with each other in accordance with a predetermined two coordinate system;
   ram means occupying an index position relative to which the punches and dies are movable in unison within the extremes of a preselected coordinate field so as to present to the ram means a punch and die pair selected to form an embossure;
   coordinate selector means for each coordinate, each settable in accordance with a predetermined code to identify a given coordinate position and thereby identify a particular punch and die pair selected for operation;
   and means to translate a code position set in the selector means into direct movement of the punches and dies bodily from any prior coordinate position directly along an unbroken substantially linear path, corresponding to the vector sum of the settings of said coordinate selector means, to said given coordinate position to move said particular punch and die pair to said index position.

2. In an embossing machine, a punch and die operating and selection mechanism comprising:
   a series of punches and a series of complemental dies arranged in alignment with each other in accordance with a predetermined rectilinear "x–y" coordinate system;
   ram means occupying an index position relative to which the punches and dies are movable in unison within the extremes of a preselected coordinate field so as to present to the ram means a punch and die pair selected to form an embossure;
   separate "x" and "y" coordinate selector means each settable in accordance with a predetermined code to identify a given coordinate position and thereby identify a particular punch and die pair selected for operation;
   and means to translate a code position set in the selector means into movement of the punches and dies, simultaneously along both the coordinate axes from any prior coordinate position directly along an unbroken substantially linear path to said given coordinate position to move said particular punch and die pair to said index position.

3. In an embossing machine, a punch and die operating and selection mechanism comprising:
   a series of punches and a series of complemental dies arranged in alignment with each other in accordance with a predetermined rectilinear "x–y" coordinate system;
   ram means occupying an index position relative to which the punches and dies are movable in unison within the extremes of a preselected coordinate field so as to present to the ram means a punch and die pair selected to form an embossure;
   separate "x" and "y" coordinate selector means each including a plurality of selector devices individually settable in accordance with a predetermined code to identify a given coordinate position and thereby identify a particular punch and die pair selected for operation;
   and means to translate a code position set in the selector devices of said selector means, simultaneously, into movement of the punches and dies from any prior coordinate position directly along an unbroken substantially linear path to said given coordinate position to move said particular punch and die pair to said index position.

4. In an embossing machine, a punch and die operating and selection mechanism comprising:
   a series of punches and a series of complemental dies arranged in a matrix in alignment with each other in accordance with a predetermined coordinate system;
   ram means occupying an index position relative to which the punch and die matrix is movable within the extremes of a preselected coordinate field so as to present to the ram means a punch and die pair selected to form an embossure;
   coordinate selector means settable in accordance with a predetermined code to identify a given coordinate position and thereby identify a particular punch and die pair selected for operation;
   said selector means comprising a plurality of rotatable selector devices each actuatable between first and second polar operating positions separated by a predetermined linear displacement;
   and means connecting all of said selector devices to said matrix to translate a code position set in the selector devices into direct movement of the punch and die matrix bodily from any prior coordinate position along an unbroken substantially linear path to said given coordinate position to move said particular punch and die pair to said index position.

5. In an embossng machine, a punch and die operating and selection mechanism comprising:
   a series of punches and a series of complemental dies arranged in a matrix in alignment with each other in accordance with a predetermined coordinate system, said matrix being movable along two coordinate axes;
   ram means occupying an index position relative to which the punch and die matrix is movable within the extremes of a preselected coordinate field so as to present to the ram means a punch and die pair selected to form an embossure;
   first and second sets of rotary selector devices each actuatable between polar operating positions separated by a predetermined linear displacement, in accordance with a predetermined code, to identify a given coordinate position and thereby identify a particular punch and die pair selected for operation;
   summing means for summing the linear displacement of the actuated selector devices separately in each set;

said summing means including slide means connecting all of the selector devices in each set to said matrix;

and means for actuating selected ones of said selector devices substantially simultaneously to move the punch and die matrix from any prior coordinate position directly along an unbroken substantially linear path to a given coordinate position determined by the selected selector devices and thereby move a particular punch and die pair to said index position.

6. In an embossing machine, a punch and die operating and selection mechanism comprising:
   a series of punches and a series of complemental dies, all of uniform size, arranged in a matrix in alignment with each other in accordance with a predetermined coordinate system having two axes;
   ram means occupying an index position relative to which the punch and die matrix is movable within the extremes of a preselected coordinate field so as to present to the ram means a punch and die pair selected to form an embossure;
   first and second coordinate selector means, one for each axis, each comprising a plurality of selector devices settable in accordance with a binary code to identify a given coordinate position and thereby identify a particular punch and die pair selected for operation;
   and means to translate a code position set in the selector means into direct movement of the punch and die matrix from any prior coordinate position along an unbroken substantially linear path to said given coordinate position to move said particular punch and die pair to said index position.

7. In an embossing machine, a punch and die operating and selection mechanism comprising:
   at least two series of punches and corresponding series of complemental dies, the punches and dies of each series being of uniform size different from the size of any other series, arranged in a composite matrix in alignment with each other in accordance with a predetermined coordinate system;
   ram means occupying an index position relative to which the punch and die matrix is movable within the extremes of a preselected coordinate field so as to present to the ram means a punch and die pair selected to form an embossure;
   coordinate selector means, comprising a plurality of selector devices settable in accordance with a modified binary code determined by size variations between different punch and die series to identify a given coordinate position and thereby identify a particular punch and die pair selected for operation;
   and means to translate a code position set in the selector means into direct movement of the punch and die matrix from any prior coordinate position along an unbroken substantially linear path to said given coordinate position to move said particular punch and die pair to said index position.

8. A character selection mechanism, for an embossing machine including a plurality of different punch and die character elements disposed in a matrix movable along two coordinate axes relative to a predetermined index position, comprising:
   first and second sets of selector means, each including a plurality of rotary selector devices each actuatable between first and second polar positions separated by a predetermined linear displacement;
   and means for summing the linear displacement of the actuated selector devices simultaneously but separately in said sets and for shifting the matrix to a coordinate position in proportion to the cumulative positioning of all of the selector devices and along a direct path corresponding to the vector sum of the displacements of said selector devices.

9. A character selection mechanism, for an embossing machine including a plurality of different punch and die character elements disposed in a matrix movable along two coordinate axes relative to a predetermined index position, comprising:
   first and second sets of selector means, one for each axis, each including a plurality of rotatably settable selector devices each actuatable between first and second polar positions separated by a predetermined linear displacement;
   said selector means each including a plurality of followers each movable along the axis corresponding to said selector means responsive to displacement of a respective one of said selector devices,
   the followers for each selector means connecting the selector devices of that selector means to each other and to said matrix to move said matrix parallel to the axis corresponding to that selector means;
   and means for actuating selected ones of said selector devices substantially simultaneously to shift the matrix to a coordinate position determined by the cumulative displacement of all of the selector devices, moving the matrix along a path corresponding substantially to the vector sum of the displacements of the selector devices relative to their immediately previous positions.

10. A character selection mechanism for an embossing machine which includes a plurality of different punch and die pairs disposed in predetermined code positions in a matrix movable along two coordinate linear axes relative to a predetermined character reproduction position, comprising:
    first and second selector means, each including a plurality of rotatable selector devices disposed in aligned relation to each other and individually actuatable between first and second polar operating positions separated by a predetermined linear displacement which is different for each device in accordance with said prearranged code,
    said selector means each further including slides connecting the selector devices in that selector means to each other and to said matrix,
    said slides each being displaceable a different amount in accordance with said code to move the matrix parallel to a respective one of said axes in proportion to the cumulative positioning of all of the slides of that selector means;
    and means for actuating selected ones of said selector devices substantially simultaneously to position a given punch and die pair at said reproduction position by moving said matrix by way of the displaced ones of said slides directly along a path corresponding substantially to the vector sum of the displacements of said selector slides relative to their previous positions.

11. A character selection mechanism for an embossing machine including a plurality of different punch and die pairs disposed in a matrix movable along two coordinate axes relative to a predetermined index position, comprising:
    first and second selector means, each including a plurality of selector devices each actuatable between first and second operating positions separated by a predetermined displacement,
    said selector means each further including means connecting the selector devices in that selector means to said matrix to move the matrix along a respective one of said axes in proportion to the cumulative positioning of all of the selector devices of that selector means;
    and means for actuating selected ones of said selector devices substantially simultaneously to position a given punch and die pair at said index position by moving said matrix directly along a path corresponding substantially to the vector sum of the displacements of said selector devices relative to their previous positions.

12. A character selection mechanism for an embossing machine including a plurality of different punch and die pairs disposed in a matrix movable along two coordinate axes relative to a predetermined index position, comprising:

first and second selector means, each including a plurality of selector devices each actuatable between first and second operating positions separated by a predetermined displacement, said selector means each further including a plurality of lineally displaceable followers connecting the selector devices in that selector means to each other and to said matrix to move the matrix along a respective one of said axes in proportion to the cumulative positioning of all of the selector devices of that selector means;

and means for actuating selected ones of said selector devices substantially simultaneously to position a given punch and die pair at said index position by moving said matrix directly along a path corresponding substantially to the vector sum of the displacements of said selector devices relative to their previous positions.

13. A character selection mechanism for an embossing machine including a plurality of different punch and die pairs disposed in a matrix movable along two coordinate axes relative to a predetermined index position, comprising:

first and second selector means, one for each axis, each including a plurality of selector devices each actuatable between first and second operating positions separated by a predetermined displacement, said selector means each further including connector means connecting the selector devices in that selector means to said matrix to move the matrix along a respective one of said axes in proportion to the cumulative positioning of all of the selector devices of that selector means;

a first common drive for all of the selector devices in said first selector means;

a second common drive for all of the selector devices in said second selector means;

and selectively operable input means, coupling the common drive to the selector devices in each selector means for actuating selected ones of said selector devices substantially simultaneously to position a given punch and die pair at said index position by moving said matrix directly along a path corresponding substantially to the vector sum of the displacements of said selector devices relative to their previous positions.

14. Mechanism according to claim 13 wherein the input means are in the form of electrically actuated normally disengaged clutches, one for each selector device.

15. A character selection mechanism for an embossing machine including a plurality of different pairs of punch and die character elements of predetermined related dimensions disposed in a matrix movable along two rectilinear coordinate axes relative to a predetermined index position, said mechanism comprising:

first and second selector means, each including a plurality of selector devices each actuatable between first and second positions separated by a predetermined linear displacement constituting a given multiple of a character element dimension;

means for simultaneously summing the linear displacements of the actuated selector devices separately in said selector means; means for shifting the matrix along a path corresponding to the vector sum of the displacements of the selector devices to a coordinate position in proportion to the cumulative positioning of all of the selector devices;

and means, including individual selector sensing members associated with each selector device, for sensing completion of each selection operation by the positions of said selector devices.

16. A character selection mechanism for an embossing machine including a plurality of different punch and die character elements disposed in a matrix movable along two coordinate axes relative to a predetermined index position, comprising:

first and second selector means, each including a plurality of selector devices each actuatable between first and second positions separated by a predetermined linear displacement;

means for summing the linear displacement of the actuated selector devices separately in said selector means and for shifting the matrix to a coordinate position in proportion to the cumulative positioning of all of the selector devices;

a first series of selector switches, one for each selector device, each actuatable from a normal condition to an actuated condition whenever the associated selector device is in its first position;

a second series of selector switches, one for each selector device, each actuatable from a normal condition to an actuated condition whenever the selector device is in its second position;

and signal means connected to said selector switches for signalling completion of a character selection operation.

17. A character selection mechanism as in claim 16 including a third series of selector switches, connected to said signal means, one for each selector device, each actuatable between an open condition and a closed condition whenever the associated selector device is in either of its first and second positions.

18. A character selection mechanism, for an embossing machine comprising:

a plurality of different punch and die character elements disposed in predetermined alignment in a matrix movable along two coordinate linear axes relative to a predetermined index position, certain of said character elements bearing individual alpha-numerical characters, and others bearing alpha-numerical characters and encoded representations thereof;

first and second selector means, each including a plurality of selector devices each actuatable between first and second operating positions having different binary code values for each such device, said selector means each further including a plurality of linearly displaceable followers each settable in accordance with the binary code value of a related selector device, said followers connecting the selector devices in each selector means to each other and to said matrix to move the matrix parallel to a respective one of said axes in proportion to the cumulative positioning of all of the followers of that selector means;

and means for actuating selected ones of said selector devices simultaneously to move said matrix along a substantially linear path corresponding to the vector sum of the displacements of said followers.

References Cited by the Examiner

UNITED STATES PATENTS

| | | | |
|---|---|---|---|
| 496,373 | 4/1893 | Travis | 197—6.3 |
| 825,261 | 7/1906 | Bontempi | 197—2 |
| 1,702,611 | 2/1929 | Morse et al. | 197—6.2 |
| 2,115,455 | 4/1938 | Chisholm | 197—6.2 |
| 2,927,676 | 3/1960 | Obbondanza | 197—6.6 |

ROBERT E. PULFREY, *Primary Examiner.*

E. S. BURR, *Assistant Examiner.*